Figure 1:
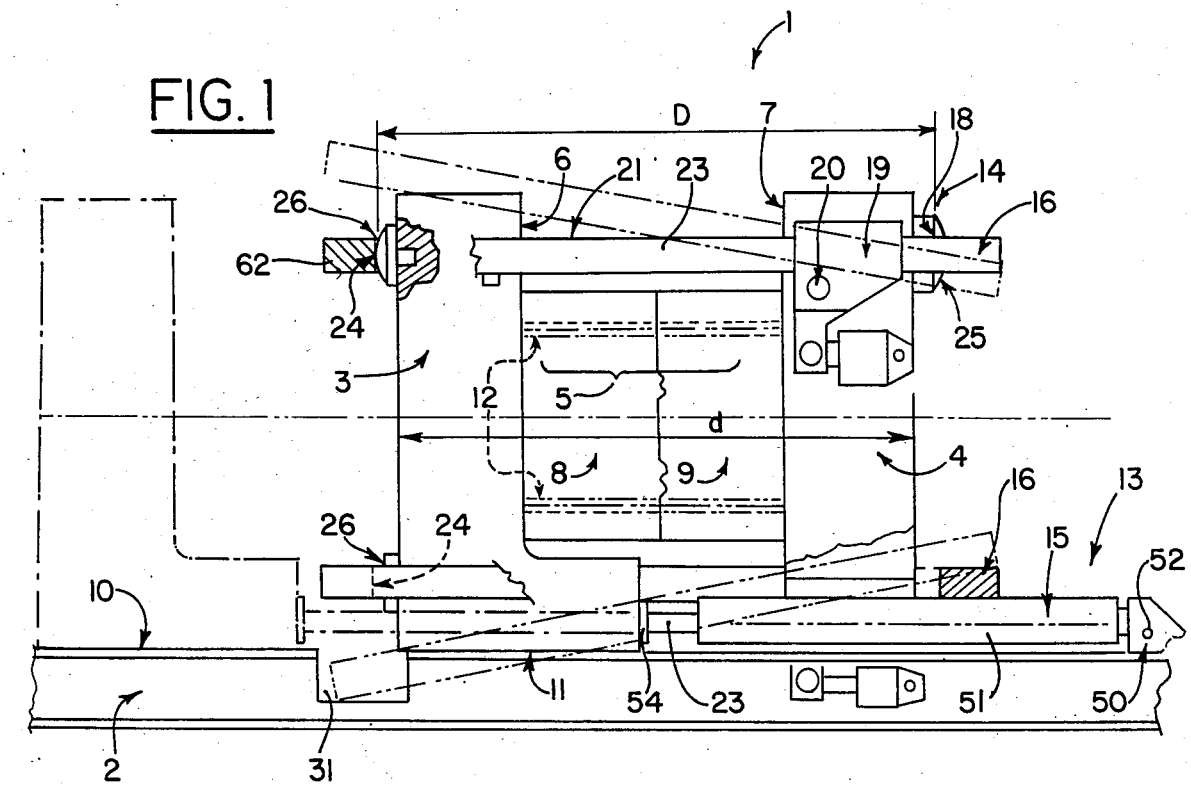

United States Patent [19]

Rivière et al.

[11] Patent Number: 4,696,637

[45] Date of Patent: Sep. 29, 1987

[54] TRACTION TYPE PRESS

[76] Inventors: Guy Rivière, 382 Boulevard Albert 1er, 59500 Douai; Jean P. Luczak, 34, Rue Jules Guesole, 62430 Sallaumines, both of France

[21] Appl. No.: 875,998

[22] Filed: Jun. 19, 1986

[30] Foreign Application Priority Data

Jun. 19, 1985 [FR] France .................. 85 09674

[51] Int. Cl.⁴ .................. B29C 45/64; B29C 45/66
[52] U.S. Cl. .................. 425/589; 164/341; 425/451.9; 425/595; 425/DIG. 221
[58] Field of Search ............... 425/150, 541, 542, 589, 425/590, 595, 450.1, 451.9, DIG. 221, DIG. 223, 451.2, 190; 164/341, 343, 303, 342

[56] References Cited

U.S. PATENT DOCUMENTS

| 4,148,353 | 4/1979 | Quere | 164/341 |
| 4,348,165 | 9/1982 | Vostrovsky | 425/190 |

FOREIGN PATENT DOCUMENTS 0050520 4/1982 European Pat. Off. .
1427490 3/1965 France .

*Primary Examiner*—Jay H. Woo
*Assistant Examiner*—Timothy W. Heitbrink
*Attorney, Agent, or Firm*—Dennis P. Clarke

[57] ABSTRACT

A traction type press for shaping a material in a mold type assembly comprising a clamping means associated with a fixed or mobile plate bearing directly on the plate and on the bearing element of the clamping structure situated behind the plate.

11 Claims, 6 Drawing Figures

TRACTION TYPE PRESS

The invention relates to a traction type press, that is to say in which the means producing the closure and clamping forces are associated with the fixed plate so as to, at the time of closing, pull the mobile plate in the direction of the fixed plate.

More particularly, but not exclusively, it applies to presses for shaping a material in an assembly such as a mold and particularly to injection molding presses, whether these presses are horizontal or vertical This assembly is generally split into two main parts which cooperate together.

The press itself comprises mainly a rigid frame and at least two plates each of which is associated one of the parts of the assembly.

Of course, at least one of these plates is mobile in translation with respect to the other which, serving as reference, is fixed or is considered as such.

In all these presses, the closure phase comprises generally two consecutive steps:
 a step for rapidly bringing the plates together;
 a step for energetically clamping the cooperating parts of the assembly one against the other.

For this, the press comprises means such as actuating cylinders which each provide one of these functions, which are very different since the first one requires a long stroke and not much force whereas the second one requires a short stroke but very large force.

Conventionally, the cooperating parts of the tool are each provided with means which, during the step for closing the press, ensure positioning thereof with respect to each other.

Generally, the self positioning means only come into action during the closure phase of the press a little before the opposite faces of the cooperating parts of the assembly come into contact.

In addition to the means for self positioning of the parts of the assembly, the presses themselves generally comprise columns for guiding the mobile plate with respect to the fixed plate not only during their approach step but also during their closure step.

Added to the guidance proper to the assembly, such guiding of the press is hyperstatic and thus has the serious drawback of generating uncontrollable stresses should there be a defect of parallelism of the columns and/or of the faces of the assemblies.

Moreover, that greately hinders access to the fixed and mobile plates for fitting-removing the tool assembly and for removing the moldings.

To overcome these drawbacks traction presses are known (U.S. Pat. No. 4,148,353 and EP-A-50529) without guide columns and in which the means for clamping the fixed and mobile plates are associated by bearing elements presented at the front and at the rear by a clamping structure, on one at least of which front and rear bearing elements the corresponding plate comes to bear through clamping means and a false plate.

The spacing between the false plate and the opposite plate or, if there is one, its false plate, is therefore determined by the structure which then works under traction during the action of the clamping means.

However, these false plates complicate the press and increase both the cost price thereof and the space required.

One result which the invention aims at obtaining is a press of the above mentioned type which overcomes these drawbacks.

For this, it has an object such a press which is particularly characterized in that the clamping means associated with a fixed or mobile plate bear directly on this plate and on the bearing element of the clamping structure situated behind the plate considered.

Figure 2:
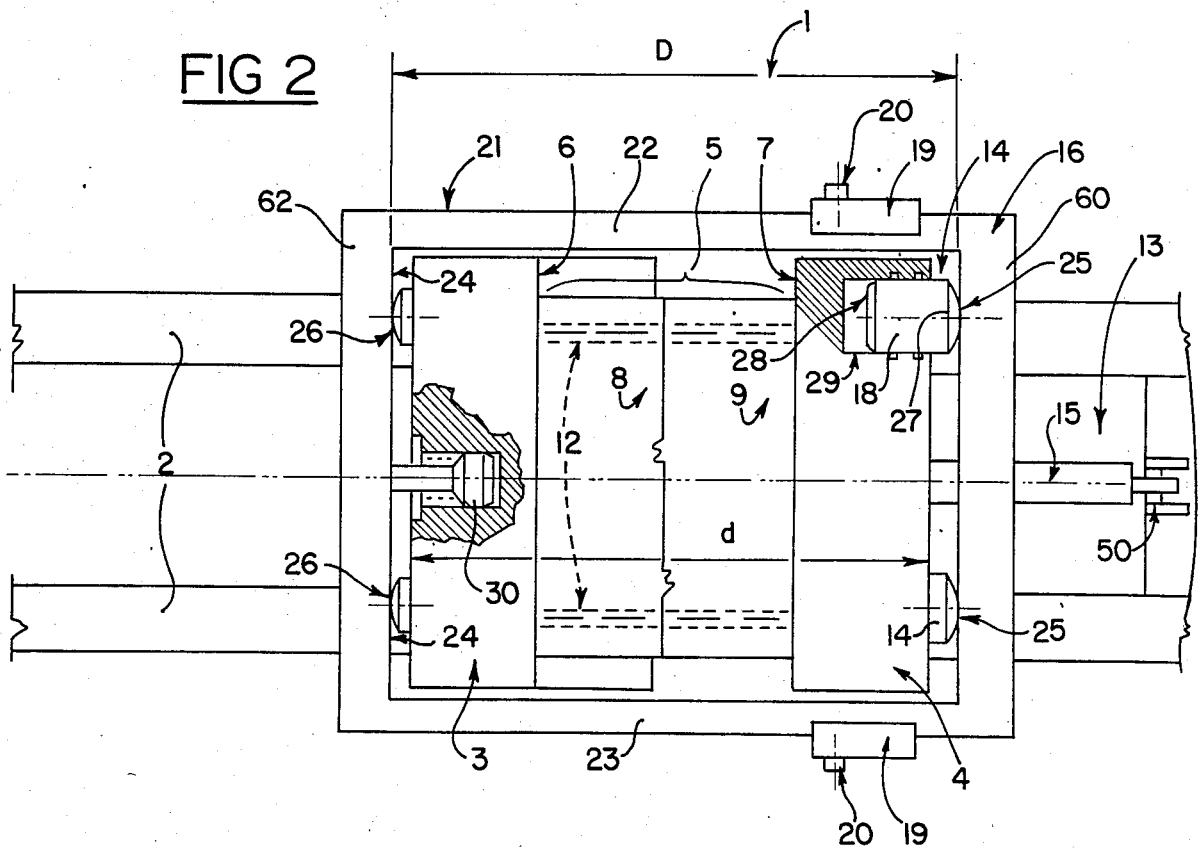
Figure 3:
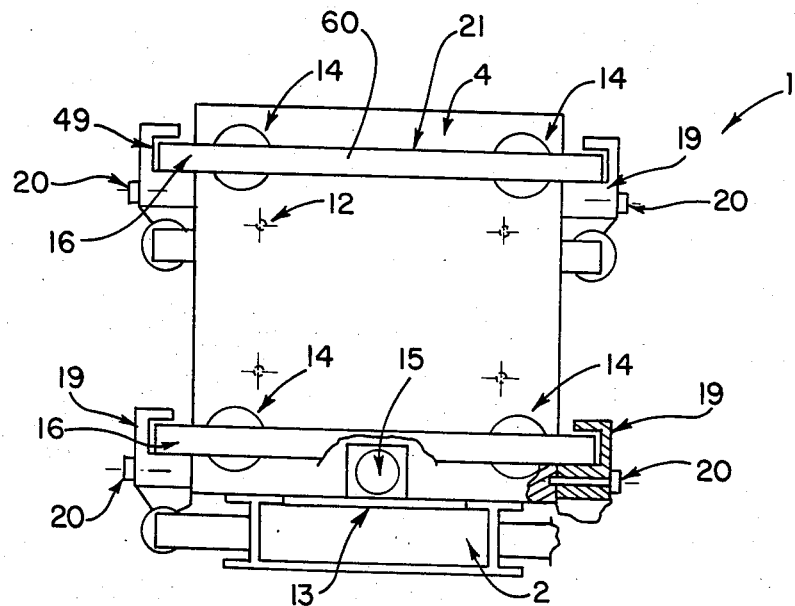
Figure 4:
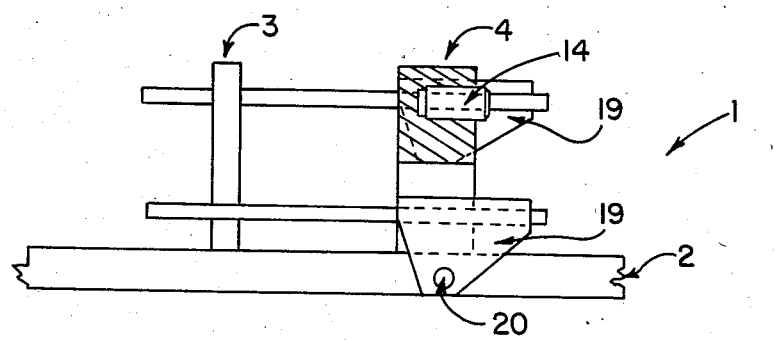
Figure 5:
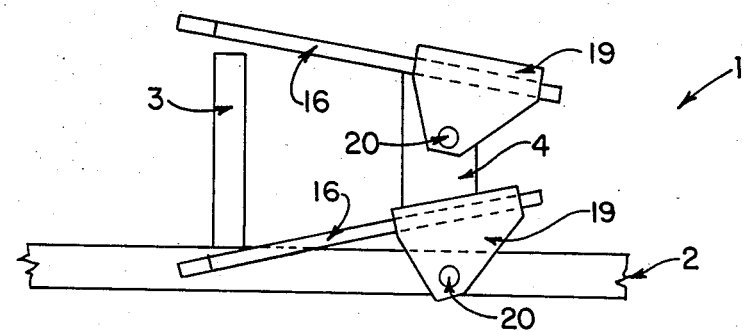
Figure 6:
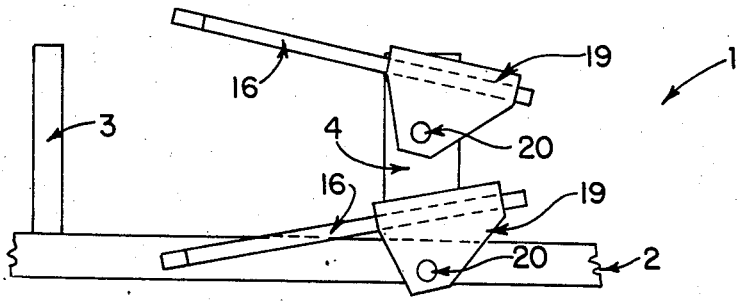

The invention will be better understood from the following description, given by way of non limitative example, with reference to the accompanying drawings which show schematically:

FIG. 1: a front view of the press of the invention,
FIG. 2: a top view of the press shown in FIG. 1;
FIG. 3: a right hand view of the press shown in FIG. 1,
FIGS. 4 to 6: the press shown symbolically in three different steps of its operating cycle.

Referring to the drawings, a press 1 is shown comprising mainly a rigid frame 2 and at least two plates 3, 4 between which is disposed an assembly 5, such as a mold.

Conventionally, the opposite work of useful faces 6, 7 of plates 3, 4 are situated in substantially parallel planes.

The assembly 5 is conventionally split into at least two main parts 8, 9, each carried by one of the plates 3, 4 and having their own self positioning means 12.

At least one of the plates 3, 4 is mobile in translation relatively to the other in a direction substantially perpendicular to the face 7 of the upper plate.

In the rest of the description, without that in any way limiting the invention, it will be considered, on the one hand, that a single one (3) of the plates 3, 4 is movable in translation with respect to the frame and, on the other hand, that this translational movement of the mobile plate takes place substantially parallel to the frame 2 in a substantially horizontal plane.

The mobile plate 3 rests on the surface 10 of the frame which, in this example, is substantially flat and horizontal and thus forms a relative guide bench.

The side 11 of the mobile plate 3 which forms a bearing face cooperates with the bench 10 of frame 2 and, for this reason, is substantially perpendicular to its useful face 6.

The press is without columns for guiding the mobile plate 3 with respect to the fixed plate 4, which for their guidance only comprise, on the one hand, means 12 for self positioning the parts 8, 9 of assembly 5, which self positioning means only come into action at the end of closure and, on the other hand, the approximative guide means such as the bearing of the edge 11 of the mobile plate against bench 10, which bearing action may continue during the whole closure travel and may be sliding or rolling particularly in the horizontal press version.

Such bearing is however not necessary and, for example, the mobile plate may be suspended from a lifting and/or handling machine.

Because of this original guidance method, access to the useful faces 6, 7 of the plates is totally freed and the mobile plate 3 remains entirely independent of the rest of the press.

It may then be exchanged for example for a rapid tool change.

Moreover, during clamping, it is free to move so that the parts of the tool assembly will always be well applied against each other, whatever the possible defects of parallelism of their bearing faces on each other and on the plates.

In a way known per se, the translational movement of the mobile plate takes place from an endmost open position (shown with fine broken lines in FIG. 1), in whch the tool assembly 5 is wide open, to an endmost closed position in which the component parts of the tool assembly cooperate closely.

The closure phase of the press takes place substantially in two steps.

A step for drawing the plates together and an energetic clamping step.

To provide these two consecutive steps, press 1 conventionally uses separate means 13, 14, the ones called approach means for rapid movement over a large distance but without great force the others called clamping means 14 providing a movement over a short distance but developing the clamping force.

As mentioned above, the approach means 13 may be external to the press, such as a lifting and/or handling machine but, preferably, they consist of at least one hydraulic cylinder 15 of small section inserted between the mobile plate 3 and a bearing point 50 of the frame and situated far in front of the useful face 6 of the mobile plate 3.

In this arrangement, the approach cylinder does not increase the length of the press, which is obviously very advantageous.

In a preferred embodiment, instead of being disposed on at least two opposite sides of the press, these two approach means 13 ar disposed on the same side and on the side contiguous with the bearing plane 10 of frame 2 so as to keep the free access to the useful or work faces 6, 7 of plates 3, 4.

Preferably, particularly when the press is vertical, it is by its cylinder 51 that the actuator 15 is associated, for example by a pin 52, with the bearing point 50.

Should a piston break, so that the mobile plate cannot suddenly drop, the plate is connected to the approach cylinder by simply bearing on its end and for example on the end of rod 53 which, for this, may be shaped so as to have a platen 54 for fixing to the mobile plate if required.

The means 14 for clamping plates 3, 4 ar inserted between one of the plates 3, 4 and at least one bearing point 25 situated behind the same plate and connected to the other plate by at least one bearing point 24 of a clamping structure 16 adapted for gripping and pullng this plate towards the one behind which the clamping means 14 are mounted.

With this arrangement, when the clamping means 14 consist of cylinders, during their maximum force, these latter may work under compression and therefore under the best possible conditions.

These cylinders 14 may be in addition single acting and comprise a piston 18 which, by its face 27 opposite its work face 28, is directly in contact with the bearing point 25.

Its cylinder 29 may be formed by a simple blind hole formed in the rear face of plate 4.

Preferably, it is behind the fixed plate that the clamping means 14 are situated.

Because of the connection provided by the clamping structure, the independence between the plates is kept and, under these conditions, during clamping they remain free to move so that the parts of the tool assembly will always be well applied against each other whatever the possible defects of parallelism of their bearing faces one on the other and on the plates, the cylinders in all these circumstances being nevertheless able to ensure balancing of the pressures.

The distance "D" between the front 24 and rear 25 bearing points of the clamping structure 16, is greater than that, "d" measured between the rear faces of the plates, so as to be able to move slightly forwards and rearwards for controlling the unclamping and clamping of the plates.

In a non limitative embodiment of the invention, each clamping structure 16 consists substantially of a substantially rectangular rigid frame 21 having inner dimensions sufficient for passing around the plates 3, 4.

This frame comprises then two longitudinal members 22, 23 situated each on one side of the press and two transverse beams 60, 62 situated one (24) behind the mobile plate where it serves as front bearing point for this plate and the other (25) behind this plate 4 where it serves as rear bearing point for the clamping means 14.

In accordance with an essential feature of the invention, the clamping means 14 associated with a fixed or mobile plate 4 bear directly on this plate and on the bearing element 25 of the clamping structure 16 situated behind the plate considered.

At least one of the plates carries at least one support 19 in which each structure 16 is guided in translation forwardly and rearwardly.

Independently of this translational guiding, each structure has at one of its ends a means for pivoting about an axis orthogonal to the direction of movement of the structure so as to allow pivoting thereof with respect to a plate namely, preferably, the fixed plate.

In a preferred embodiment applied to a vertical press, these pivoting means for each frame comprise essentially a groove with axis orthogonal to the direction of movement of the structure, formed on the top of the clamping means 14 and in which the corresponding frame rests by simple gravity through its tranverse beam 60.

In the case of a horizontal press and, possibly in the case of a vertical press, the pivoting means is a shaft 20 with axis orthogonal to the direction of movement of the structure and which passes through the above mentioned support 19.

Between each support 19 and a fixed point with respect to the plate on which the end of the frame is pivotally mounted, there is inserted a means for controlling the oscillation about the axis of the pivoting means, of the corresponding structure 16, so as to cause this latter to swing until the corresponding bearing points 24 are released from the other plate and allow opening of the press.

In a non limitative embodiment, the press comprises two clamping structures 16 which are substantially parallel to each other and are generally disposed for optimum distribution of the clamping forces on the tool assembly and, on the other hand, four clamping means 14 which are distributed at the rate of two per structure 16, substantially at the angles of a rectangular quadrilateral inscribed on the face 14 of the plate with which they are associated.

Preferably, each bearing point 24 of the clamping structure 16 cooperates with a mobile plate 13 by means of studs 26 with spherical bearing surface and generally distributed in the same arrangement as the clamping members 14 which are situated between the facing plate.

Similarly, in a non limitative embodiment of the invention, the clamping means 14 have a spherical bearing surface 27 for cooperating with the bearing point 25.

The means 17 controlling the oscillation of supports 19 and of their clamping structures are for example formed by hydraulic cylinders.

When the clamping means 14 are formed by single acting cylinders, the press 1 further comprises a means for controlling the disengagement of the clamping structure 16 from studs 26 before oscillation of the clamping structure 16 and opening of the press.

This control means 30 is for example formed by a cylinder supported by the rear face of the mobile plate 3 which pushes back the clamping structure 16 so as to force the clamping means 14 to retract.

Frame 2 may be formed by simple structural sections in which, of course, a cut out 31 will be provided as required for making room for the oscillation of the clamping structure 16.

What is claimed is:

1. Traction type press comprising a rigid framework and at least two plates having work surfaces, of which is a mold assembly disposed between the work surfaces, said mold assembly comprising two mold halves each carried by one of the plates, said mold halves being provided with their own self positioning means;

one of the plates being movable with respect to the rigid framework and to the other plate, said other plate being fixed with respect to the framework, the movable plate having at least one side for moving along a bearing surface of the framework, wherein translational movement of the movable plate takes place from an endmost open position, in which the tool assembly is open wide, to an endmost closed position in which the component parts of the tool assembly cooperate closely, wherein the closure of the press takes place in two steps, a first step for bringing the plates together and a second step for applying clamping force, wherein the press uses separate means for carrying out the first and second steps, the press having an approach means providing rapid movement over a large distance but without a high force to accomplish the first step, and a clamping means providing movement over a short distance and developing the clamping force to accomplish the second step, press:

and wherein the action of the clamping means is retransmitted from one of the plates to the other by at least one clamping structure which consists substantially of a rigid substantially rectangular frame of inner dimensions sufficient for passing with play about the fixed and movable plates, said frame comprising longitudinal members each situated on one side of the press and two transverse beams situated behind the fixed and movable plates where said transverse beams form bearing element with the fixed movable plates, each clamping structure being attached to one of the plates
by a pivoting means, the press further comprising a means for controlling swinging of the clamping structure so as to free a corresponding bearing element from the opposite plate and allow opening of the press, and wherein the clamping means bears directly on one of the plates and on the bearing element of the transverse beam situated behind said one of the plates.

2. Fraction type press according to claim 1, characterized in that, on the clamping structure, is mounted a support which is free in translation with respect thereto and in that said means for controlling the swinging acts on the clamping structure through said support.

3. Fraction type press according to claim 2, characterized in that the pivoting means is a pin with an axis orthogonal to a direction of movement of the longitudinal members.

4. Fraction type press according to claim 2 wherein the press is a vertical press, characterized in that the pivoting means comprises a groove with an axis orthogonal to a direction of movement of the clamping structure and formed on the top of the clamping means and in which groove the frame rests on a transverse beam by gravitational force.

5. Fraction type press according to any one of claim 1 to 4, characterized in that said press further comprises a control means for controlling detachment of the clamping structure from the movable plate.

6. Fraction type press according to claim 5, characterized in that the control means is formed by a hydraulic cylinder carried by the rear face of the movable plate which pushes back the clamping structure so as to force the clamping means to retract.

7. Fraction type press according to any one of claims 1 to 4, characterized in that said press is free of columns for guiding the movable plate with respect to the fixed plate, whereby the press accomplishes guidance by the self positioning means of the parts of the tool assembly where said self positioning means only comes into action at the end of closing of said press and,
the press accomplishes rough guidance by bearing of the movable plate against the bearing surface of the framework, where bearing action may continue throughout the extent of the closure of the press.

8. Fraction type press according to any one of the claims 1 to 4 wherein said approach means includes at least one hydraulic approach cylinder of small section inserted between the movable plate and a bearing point fixed to the framework and situated far in front of the work face of the movable plate, and wherein said are approach means is disposed on the side of the plates which is contiguous with the bearing surface of the framework so as to preserve free access to the work faces of the plates.

9. Fraction type press according to claim 8, characterized in that the movable plate is connected to the approach cylinder by a platen at an end of the approach cylinder.

10. Fraction type press according to claim 4, characterized in that said press comprises a control means for controlling the detachment of the bearing points of the clamping structure from the movable plate, and characterized in that the control means is formed by a hydraulic cylinder carried by the rear face of the movable plate which pushes back the clamping structure so as to force the clamping means to retract, and characterized in that said press is free of columns for guiding the movable plate with respect to the fixed plate, and the press accomplishes guidance by the self positioning means of the parts of the tool assembly, which self positioning means only comes into action at the end of closing of said press and, the press accomplishes rough guidance by bearing the movable plate against the bearing surface of the framework, which bearing action may continue throughout the extent of the closure of the press.

11. Fraction type press according to claim 10 wherein said approach means includes at least one hydraulic approach cylinder of small section inserted between the movable plate and a bearing point integral with the framework and situated far in front of the work face of the movable plate, and wherein said approach means is disposed on the side of the plates which is contiguous with the bearing surface of the framework so as to preserve free access to the work faces of the plates.

* * * * *